(12) United States Patent
Muroya et al.

(10) Patent No.: US 9,914,667 B2
(45) Date of Patent: Mar. 13, 2018

(54) FRICTION MATERIAL

(71) Applicant: AKEBONO BRAKE INDUSTRY CO., LTD., Tokyo (JP)

(72) Inventors: Yuki Muroya, Tokyo (JP); Satoshi Kusaka, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/021,711

(22) PCT Filed: Sep. 17, 2014

(86) PCT No.: PCT/JP2014/074548
§ 371 (c)(1),
(2) Date: Mar. 14, 2016

(87) PCT Pub. No.: WO2015/041244
PCT Pub. Date: Mar. 26, 2015

(65) Prior Publication Data
US 2016/0221882 A1    Aug. 4, 2016

(30) Foreign Application Priority Data

Sep. 17, 2013  (JP) ................................ 2013-192144

(51) Int. Cl.
| | | |
|---|---|---|
| *F16D 69/02* | (2006.01) |
| *C04B 35/76* | (2006.01) |
| *C04B 35/01* | (2006.01) |
| *C04B 35/462* | (2006.01) |
| *C04B 35/622* | (2006.01) |
| *C04B 35/626* | (2006.01) |
| *C04B 35/628* | (2006.01) |
| *C04B 35/634* | (2006.01) |
| *C04B 35/80* | (2006.01) |

(52) U.S. Cl.
CPC ............ *C04B 35/76* (2013.01); *C04B 35/013* (2013.01); *C04B 35/462* (2013.01); *C04B 35/6269* (2013.01); *C04B 35/62209* (2013.01); *C04B 35/62805* (2013.01); *C04B 35/634* (2013.01); *C04B 35/806* (2013.01); *F16D 69/026* (2013.01); *C04B 2235/3201* (2013.01); *C04B 2235/3203* (2013.01); *C04B 2235/3206* (2013.01); *C04B 2235/3208* (2013.01); *C04B 2235/3215* (2013.01); *C04B 2235/3234* (2013.01); *C04B 2235/3236* (2013.01); *C04B 2235/3248* (2013.01); *C04B 2235/3481* (2013.01); *C04B 2235/405* (2013.01); *C04B 2235/425* (2013.01); *C04B 2235/44* (2013.01); *C04B 2235/448* (2013.01); *C04B 2235/48* (2013.01); *C04B 2235/522* (2013.01); *C04B 2235/526* (2013.01); *C04B 2235/5212* (2013.01); *C04B 2235/5216* (2013.01); *C04B 2235/5232* (2013.01); *C04B 2235/5264* (2013.01); *C04B 2235/5292* (2013.01); *C04B 2235/604* (2013.01); *F16D 2200/0065* (2013.01); *F16D 2200/0086* (2013.01)

(58) Field of Classification Search
CPC ..... C04B 35/76; C04B 35/013; C04B 35/462; C04B 35/62209; C04B 35/6269; C04B 35/62805; C04B 35/634; C04B 35/806; C04B 2235/3203; C04B 2235/3206; C04B 2235/3208; C04B 2235/3215; C04B 2235/3248; C04B 2235/3481; C04B 2235/405; C04B 2235/448; C04B 2235/48; C04B 2235/5212; C04B 2235/522; C04B 2235/5232; C04B 2235/5292; C04B 2235/604; C94B 2235/3234; C94B 2235/3236; C94B 2235/5216; C94B 2235/526; C94B 2235/5264; C94B 2235/3201; F16D 69/026; F16D 2200/0065; F16D 2200/0086

See application file for complete search history.

(56) References Cited

U.S. PATENT DOCUMENTS

| | | |
|---|---|---|
| 5,962,551 A | 10/1999 | Kobayashi et al. |
| 6,432,187 B1 | 8/2002 | Ogawa et al. |
| 7,307,047 B2 | 12/2007 | Ogawa et al. |
| 7,326,741 B2 | 2/2008 | Kusaka et al. |
| 8,513,170 B2 | 8/2013 | Kato et al. |
| 9,127,733 B2 | 9/2015 | Itami et al. |
| 2002/0012783 A1 | 1/2002 | Hikichi et al. |
| 2003/0147804 A1 | 8/2003 | Ogawa et al. |

(Continued)

FOREIGN PATENT DOCUMENTS

| | | |
|---|---|---|
| CN | A-1294620 | 5/2001 |
| CN | A-1444544 | 9/2003 |

(Continued)

OTHER PUBLICATIONS

CN Office Action dated Nov. 23, 2016 from corresponding Chinese patent application No. 201480051357.0 (with attached English-language translation).

(Continued)

*Primary Examiner* — Anthony J Green
(74) *Attorney, Agent, or Firm* — Drinker Biddle & Reath LLP

(57) ABSTRACT

A friction material including two or more kinds of titanates and a ceramic fiber. The friction material includes no copper component. The two or more kinds of titanates may optionally include two or more kinds of alkali metal titanates, or the two or more kinds of titanates may optionally include an alkaline earth metal-alkali metal titanate and an alkali metal titanate.

10 Claims, No Drawings

(56) References Cited

U.S. PATENT DOCUMENTS

| | | |
|---|---|---|
| 2005/0014862 A1 | 1/2005 | Kusaka et al. |
| 2011/0092400 A1 | 4/2011 | Kato et al. |
| 2014/0202805 A1 | 7/2014 | Unno et al. |
| 2014/0342899 A1 | 11/2014 | Itami et al. |
| 2015/0369320 A1 | 12/2015 | Onda et al. |

FOREIGN PATENT DOCUMENTS

| | | |
|---|---|---|
| CN | A-1576637 | 2/2005 |
| CN | 103122959 A | 5/2013 |
| EP | 0856489 A1 | 8/1998 |
| JP | H08-337660 A | 12/1996 |
| JP | H10-46137 A | 2/1998 |
| JP | 2000-230168 A | 8/2000 |
| JP | 2000-265158 A | 9/2000 |
| JP | 2007-218395 A | 8/2007 |
| JP | 2007-277418 A | 10/2007 |
| JP | 2010-077341 A | 4/2010 |
| JP | 2010-235730 A | 10/2010 |
| JP | 2010-285558 A | 12/2010 |
| JP | 2011-102381 A | 5/2011 |
| JP | A-2013-076058 | 4/2013 |
| WO | WO-02/10069 A1 | 2/2002 |
| WO | WO-2012/066968 A1 | 5/2012 |
| WO | WO-2012/169545 A1 | 12/2012 |
| WO | WO-2012/169546 A1 | 12/2012 |
| WO | WO-2013/039183 A1 | 3/2013 |
| WO | WO-2014/098215 A1 | 6/2014 |

OTHER PUBLICATIONS

Atsushi Kamifuku et al., "The Brake Abrasion Properties in Two Kinds of Platelet Titanate Compound Formulations, and the Swift Brake Property Evaluation by Using the Thrust Test Method," Proceedings of the 25th Annual Brake Colloquium and Exhibition 2007, *SAE* International, Oct. 7-10, 2007, pp. 99-103.

The Second Office Action dated May 5, 2017 in Chinese Patent Application No. 201480051357.0 (6 pages) with an English translation (8 pages).

Extended European Search Report dated Mar. 24, 2017 in European Patent Application No. 14845206.3.

The Third Office Action dated Oct. 16, 2017 in Chinese Patent Application No. 201480051357 (6 pages) with an English translation (8 pages).

Notification of Reasons for Refusal dated Oct. 24, 2017 in Japanese Patent Application No. 2013-192144 (4 pages) with an English translation (3 pages).

Notification of Reasons for Refusal dated Dec. 19, 2017 in Japanese Patent Application No. 2013-192144 (4 pages) with an English translation (4 pages).

FRICTION MATERIAL

TECHNICAL FIELD

The present invention relates to a friction material containing no copper component, and particularly to a friction material to be used for brake pads or brake linings, clutches and the like for automobiles, railway vehicles, industrial machines and the like.

BACKGROUND ART

A friction material to be used for brakes such as disc brakes and drum brakes, clutches or the like is composed of raw materials such as a fiber base material for exerting a reinforcing function, a friction adjusting material for imparting a friction function and adjusting its friction performance and a binder for integrating these components.

With recent high-performance and speeding-up of vehicles, the role of brakes has become increasingly severe, and it is necessary to have a sufficiently high friction coefficient (effectiveness). Further, the temperature increases during braking at high speed, different from a frictional state during braking at low temperature and low speed, so that stable frictional characteristics having small changes in friction coefficient due to changes in temperature have been desired.

At present, it has been conventional that incorporation of an appropriate amount of metal fiber into a general friction material is effective for reinforcing the strength of the friction material, stabilizing the friction coefficient thereof, further maintaining the friction coefficient and improving a heat radiation effect at high temperature, improving wear resistance, and the like. Focusing attention on these characteristics of the metal fiber, Patent Document 1 discloses a friction material containing 5 to 10% by mass of steel fiber, 5 to 10% by mass of copper fiber having an average fiber length of 2 to 3 mm, and 2 to 5% by mass of zinc powder having a particle diameter of 5 to 75 μm.

According to Patent Document 1, when the friction material contains the copper fibers in an amount within a given range, the friction coefficient at low temperature can be improved, and a decrease in friction coefficient at high temperature and high speed can be suppressed. The reason for this is considered to be that during friction between the friction material and a counterpart material (disc rotor), an adhesion coating film is formed on a surface of the counterpart material due to the extensibility of copper contained in the friction material, and acts as a protective film, thereby being able to maintain the high friction coefficient at high temperature and to suppress wear of the counterpart material.

However, a wear powder of the disc rotor or a metal component contained in the friction material of the brake pad bites into the friction material and aggregates therein to form large metal masses, which remain between the brake pad and the disc rotor, in some cases. The metal masses thus formed by aggregation sometimes abnormally wear the brake pad or the disc rotor (Patent Document 2).

At present, the metal component contained in the friction material is mainly metal fiber such as steel fiber or copper fiber, in many cases. When these fibers are contained in large amounts, there is a possibility to cause the above-mentioned abnormal wear of the disc rotor.

Further, the copper component contained in the friction material is discharged as a wear powder by braking, so that the influence thereof on the natural environment has been pointed out.

Then, Patent Document 3 discloses a method for suppressing elution of the copper component in the friction material.

PRIOR-ART DOCUMENTS

Patent Documents

Patent Document 1: JP-A-2010-77341
Patent Document 2: JP-A-2007-218395
Patent Document 3: JP-A-2010-285558

OUTLINE OF THE INVENTION

Problems that the Invention is to Solve

As described above, for the purposes of preventing the abnormal wear of the counterpart material (disc rotor) and reducing an environmental load, a friction material containing no copper component, a friction material in which elution of the copper component is suppressed and the like have been variously investigated. However, the friction material containing no copper component cannot form an adhesion coating film (protective film) caused by extensibility of copper, and has problems such as reduction in friction coefficient at high temperature and an increase in wear amount.

Then, when a large amount of titanate is used in the friction material, for a substitution effect of the adhesion coating film of copper, a transfer film is formed on the counterpart material. However, when the titanate is used alone, the transfer film to be formed becomes excessively thick to cause the occurrence of cracks in the coating film and partial separation during braking. Accordingly, contact between the brake pad and the disc rotor is not stabilized, and the friction coefficient of the friction material becomes unstable, which causes a possibility of an increase in wear amount. There has therefore been room for improvement.

An object of the present invention is therefore to provide a friction material containing no copper component and having a high friction coefficient at high temperature and excellent wear resistance.

Means for Solving the Problems

The present inventors have found that a friction material containing no copper component and having a high friction coefficient at high temperature and excellent wear resistance can be obtained by further using another different kind of titanate and ceramic fiber in combination, in addition to a titanate for forming a transfer film, and thus, the present invention was completed.

In this description, the phrase "containing no copper component" means that none of copper fiber, copper powder, and cupper-containing alloy (such as brass or bronze) and compound thereof are incorporated as a raw material of the friction material. From the viewpoint of an environmental load, the amount of the copper component contained as an impurity is preferably 0.5% by mass or less.

That is, the present invention solves the above problems, and relates to the following [1] to [8].

[1] A friction material comprising two or more kinds of titanates and a ceramic fiber and comprising no copper component.

[2] The friction material according to [1], wherein the two or more kinds of titanates comprise two or more kinds of alkali metal titanates.

[3] The friction material according to [1], wherein the two or more kinds of titanates comprise an alkaline earth metal-alkali metal titanate and an alkali metal titanate.

[4] The friction material according to [1] or [2], wherein the two or more kinds of titanates comprise lithium potassium titanate and potassium titanate.

[5] The friction material according to [1] or [3], wherein the two or more kinds of titanates comprise magnesium potassium titanate and potassium titanate.

[6] The friction material according to any one of [1] to [5], wherein the ceramic fiber has a fiber diameter of 0.1 to 10 μm, a fiber length of 1 to 1000 μm and a shot content of 0.1 to 70% by mass.

[7] The friction material according to any one of [1] to [6], wherein a content of the two or more kinds of titanates in the friction material is from 3 to 40% by volume in total.

[8] The friction material according to any one of [1] to [7], wherein a content of the ceramic fiber in the friction material is from 1 to 6% by volume.

Advantageous Effects of the Invention

According to the present invention, the degree of transfer adhesion of a transfer film formed by a titanate, instead of an adhesion coating film due to a copper component, can be adjusted by another different kind of titanate, and further, the transfer film can be ground by ceramic fiber to an appropriate thickness. Thus, a friction material having a high friction coefficient at high temperature and excellent wear resistance can be obtained, even when no copper component is contained.

MODE FOR CARRYING OUT THE INVENTION

A friction material according to the present invention contains two or more kinds of titanates and ceramic fiber, and contains no copper component.

Here, in this description, "% by mass" and "% by weight" have the same meanings, respectively, and "parts by mass" and parts by weight" also have the same meanings, respectively.

<Friction Material>

The friction material generally contains a binder, a friction adjusting material, a fiber base material and a lubricating material, and contains a filler such as an organic filler or an inorganic filler, an abrasive, a metal powder or the like as the above-mentioned friction adjusting material.

The titanates in the present invention are used as the filler, and the ceramic fiber is used as the fiber base material.

<Titanate>

The friction material according to the present invention contains two or more kinds of titanates. As the titanates, two or more kinds thereof are preferably used for the purpose of adjusting the degree of transfer adhesion.

Of the two or more kinds of titanates, examples of at least one titanate include an alkali metal titanate, an alkaline earth metal-alkali metal titanate and the like. More specifically, preferable examples thereof include lithium potassium titanate, magnesium potassium titanate and the like are preferred.

Above all, a shape called a scale-like (layered) shape, columnar shape, plate-like shape or flat shape is preferred, and lithium potassium titanate or magnesium potassium titanate having such a shape is more preferred. Further, in terms of effect stabilization, the shape is more preferably a layered shape.

As the molecular formula of lithium potassium titanate, there can be used $K_xLi_yTi_zO_w$, wherein x=0.5 to 0.7, y=0.27, z=1.73, w=3.85 to 3.95, and the like.

As the molecular formula of magnesium potassium titanate, there can be used $K_xMg_yTi_zO_w$, wherein x=0.2 to 0.7, y=0.4, z=1.6, w=3.7 to 3.95, and the like.

Examples of the other titanate for adjusting the degree of formation of the transfer film include an alkali metal titanate and the like. More specifically, preferable examples thereof include potassium titanate, lithium titanate, sodium titanate and the like.

Above all, the titanate having a fibrous shape, spherical shape, powdery or amorphous shape or a shape having a plurality of convex portions is preferred, because it is different in shape from the titanate having the scale-like (layered) shape, columnar shape, plate-like shape or flat shape, and potassium titanate having such a shape is more preferably used. Above all, the titanate having the shape having a plurality of convex portions is still more preferred in terms of wear resistance.

In this description, the shape having a plurality of convex portions means that a projected shape of the titanate onto a plane can take at least a shape having convex portions in two or more directions, different from an ordinary polygon, a circle, an ellipse and the like.

The convex portion means a portion protruded from a polygon, a circle, an ellipse or the like (a basic figure) fitted to a photograph (projection view) taken by an optical or electron microscope or the like. Specific examples of the three-dimensional shapes of the titanate having the shape having a plurality of convex portions include a boomerang shape, a cross shape, an amoeba shape, parts (for example, hands, horns, leaves and the like) of various animals and plants or the whole or analogous shapes thereof, a Konpeito shape and the like, in the projection views thereof.

From the above, it is preferred that the two or more kinds of titanates in the present invention contain two or more kinds of alkali metal titanates, or contain an alkaline earth metal-alkali metal titanate and an alkali metal titanate. More specifically, it is particularly preferred to contain lithium potassium titanate and potassium titanate, or magnesium potassium titanate and potassium titanate.

The two or more kinds of titanates in the present invention may be either crystalline or amorphous. Further, from the viewpoint of improving the strength of the friction material, the titanate may be surface-treated with a silane coupling agent or the like on a surface thereof.

The content of the titanate having the scale-like (layered) shape, columnar shape, plate-like shape or flat shape in the whole friction material is preferably from 2 to 30% by volume in terms of stabilization of the effect and improvement in fade characteristics such as prevention of a decrease in friction coefficient during fading, and the content is more preferably from 2 to 25% by volume.

The content of the titanate having a fibrous shape, spherical shape, powdery or amorphous shape or a shape having a plurality of convex portions in the whole friction material is preferably from 1 to 25% by volume in terms of wear resistance, and the content is more preferably from 1 to 20% by volume.

The total content of the titanates in the friction material is preferably from 3 to 40% by volume in terms of wear resistance, and the total content is more preferably from 3 to 30% by volume.

<Ceramic Fiber>

When the titanate described above is used in large amounts, for a reinforcing effect of an adhesion function due to the transfer film, the thickness of the transfer film formed becomes excessively thick. Cracks or flaws are liable to occur in the excessively thick coating film, and the cracks or the like trigger the easy occurrence of partial separation. When the coating film is separated, contact between the friction material (brake pad) and the counterpart material (disc rotor) is not stabilized, and the effectiveness (friction coefficient) becomes unstable, which causes a possibility of deterioration in wear resistance.

On the other hand, when the abrasive is too hard and excessively grinds the transfer film, there is a possibility of the occurrence of squealing. For this reason, in the present invention, the ceramic fiber is used as the mild abrasive which grinds the transfer film to an appropriate thickness. Above all, the ceramic fiber containing shots (granulated substances) is more preferably used.

In the present invention, the ceramic fiber is one kind of inorganic fiber, and examples thereof include bio-soluble one having a feature that even when incorporated into a human body, it is decomposed in a short period of time and eliminated from the body, and bio-insoluble one.

The bio-soluble inorganic fiber means an inorganic fiber satisfying that the total amount of alkali metal oxides and alkaline earth metal oxides (the total amount of oxides of sodium, potassium, calcium, magnesium and barium) is 18% by mass or more in a chemical composition thereof, and that the mass half-life of the fiber of 20 µm or less is within 10 days in a respiratory short-term biodurability test, or that the mass half-life of the fiber of 20 µm or more is within 40 days in a short-term biodurability test at the time of intratracheal injection, or that there is no evidence of excessive carcinogenicity in an intraperitoneal test, or that there is no relating pathogenicity or tumor occurrence in a long-term respiration test (Note Q (exclusion from application of carcinogenicity) of EU Commission Directive 97/69/EC).

Such bio-soluble inorganic fiber preferably contains at least one kind selected from the group consisting of $SiO_2$, MgO and SrO as a chemical composition thereof, and specific examples thereof include bio-soluble ceramic fiber such as $SiO_2$—CaO—MgO-based fiber, $SiO_2$—CaO-based fiber, $SiO_2$—MgO-based fiber or $SiO_2$—MgO—SrO-based fiber, bio-soluble rock wool such as $SiO_2$—CaO—MgO—$Al_2O_3$-based fiber, and the like.

The ceramic fiber used in the present invention is preferably the $SiO_2$—MgO—SrO-based fiber as the bio-soluble ceramic fiber in that it has excellent heat resistance equivalent to that of alumina silica fiber, and further, has excellent biosolubility and water resistance. Further, such bio-soluble inorganic fiber is produced by fiber formation of a raw material of the inorganic fiber by a commonly used melt spinning process or the like.

As the bio-soluble rock wool or the bio-soluble ceramic fiber such as the $SiO_2$—CaO—MgO-based fiber, the $SiO_2$—CaO—MgO—$Al_2O_3$-based fiber or the $SiO_2$—MgO—SrO-based fiber, it is possible to use commercially available RB220-Roxul1000 (manufactured by Lapinus B.V.), FINE FLEX-E BULK FIBER-T (manufactured by Nichias Corporation), BIOSTAR BULK FIBER (manufactured by ITM Co., Ltd.) or the like.

Examples of the bio-insoluble ceramic fiber include $Al_2O_3$—$SiO_2$-based fiber, $Al_2O_3$—$ZrO_2$—$SiO_2$-based fiber, $Al_2O_3$-based fiber, mullite-based fiber and the like.

The ceramic fiber has preferably a fiber diameter of 0.1 to 10 µm and a fiber length of 1 to 1000 µm, and more preferably a fiber diameter of 0.2 to 6 µm and a fiber length of 10 to 850 µm. The effects of the present invention can be effectively exhibited within these ranges.

The fiber diameter and the fiber length can each be measured according to HS A9504.

Further, in general, the ceramic fiber which can be used in the present invention contains shots (granulated substances) which have not been formed into the fiber in the production process. The shot content is preferably from 0.1 to 70% by mass in the fiber base material. When the shot content is more than the above-mentioned range, attacking properties against the counterpart material increase. On the other hand, when the shot content is less than the above-mentioned range, a cleaning effect to the counterpart material cannot be expected.

It is also possible to separate the ceramic fiber from the shots in the production process and to blend them at any rate to use. Further, the ceramic fiber may be surface-treated with a silane coupling agent or the like on a surface thereof.

In the present invention, in terms of rotor attacking properties, the ceramic fiber is used usually in an amount of 1 to 6% by volume in the whole friction material, and preferably in an amount of 1 to 3% by volume.

<Other Components>

As the other components contained in the friction material according to the present invention, the binder, the friction adjusting material (the filler, the abrasive, the metal powder), the fiber base material and the lubricating material will be described below.

(Binder)

As the binder, it is only required to contain a binder which is usually used.

Specific examples thereof include thermosetting resins such as phenol resins (including straight phenol resins and various modified phenol resins), elastomer-modified phenol resins, melamine resins, epoxy resins and polyimide resins. Examples of the various modified phenol resins include hydrocarbon resin-modified phenol resins, epoxy-modified phenol resins and the like.

In the elastomer-modified phenol resin, an elastomer for modifying a phenol resin may be any resin, as long as it gives plasticity to the phenol resin, and examples of cross-linked natural rubber and synthetic rubber.

As the elastomer for modifying the phenol resin, an acrylic rubber, silicone rubber or the like is preferably used.

The elastomer-modified phenol resin is contained preferably in an amount of 10 to 30% by volume in the whole friction material, and more preferably in an amount of 10 to 25% by volume. Within this range, it is possible to attain stabilization of the friction coefficient at low temperature even in the absence of the metal component-derived adhesion coating film.

In the present invention, the binder is used usually in an amount of 10 to 30% by volume in the whole friction material, and preferably in an amount of 10 to 25% by volume.

(Friction Adjusting Material: Filler)

The organic filler or the inorganic filler other than the titanates can be contained as the filler. Examples of the organic fillers include, for example, various kinds of rubber including acrylonitrile-butadiene rubber (NBR), styrenebutadiene rubber (SBR), butadiene rubber (BR) or the like, tire tread, organic dust such as rubber dust and cashew dust, and the like.

Examples of the inorganic fillers other than the titanates include, for example, vermiculite, mica, calcium hydroxide, barium sulfate, calcium carbonate and the like.

The content of the organic filler is preferably from 1 to 20% by volume in the friction material. The content of the inorganic filler including the titanates is preferably from 1 to 70% by volume in the friction material.

(Friction Adjusting Material: Abrasive)

The smaller the particle diameter of the abrasive is, the milder the abrasive becomes. However, when it is too small, a role as the abrasive is not played. On the other hand, the larger the particle diameter is, the more the counterpart material is ground to improve the friction coefficient. However, when it is too large, the counterpart material is excessively ground. It is necessary to adjust the particle diameter or the content thereof depending on the kind, shape or Mohs hardness of the abrasive.

Examples of the abrasives include, for example, alumina, silica, silicon carbide, mullite, zirconium oxide, zirconium silicate, triiron tetraoxide, magnesia, chromite and the like.

The content of the whole abrasive is usually from 1 to 9% by volume in the friction material.

(Friction Adjusting Material: Metal Powder)

As the metal powder, a metal other than copper, such as zinc, iron, tin, aluminum or an Fe—Al intermetallic compound, can be used. The content of the metal powder is usually from 0.5 to 3% by volume in total in the friction material.

(Fiber Base Material)

As the fiber base materials, examples of organic fibers include aromatic polyamide (aramid) fiber, cellulose fiber, polyacrylic fiber and the like.

Further, examples of inorganic fibers other than the ceramic fiber include glass fiber, carbon fiber, rock wool and the like.

Examples of metal fibers include fibers of steel, aluminum, zinc, tin and a tin alloy, stainless steel and the like.

The content of the whole fiber base material also including the ceramic fiber is usually from 1 to 35% by volume in the friction material, and preferably from 5 to 30% by volume.

(Lubricating Material)

Examples of the lubricating materials include graphite, phosphate-coated graphite, polytetrafluoroethylene (PTFE), tin sulfide, molybdenum disulfide, iron sulfide, zinc sulfide, antimony trisulfide and the like. The content of the whole lubricating material is usually preferably 15% by volume or less in the friction material.

The phosphate-coated graphite is obtained by coating graphite to be usually used as a solid lubricating material, with a phosphate. Transfer adhesion to the rotor at high temperature is enhanced by coating the graphite with the phosphate, thereby being able to decrease the rotor wear amount.

For the phosphate for coating the graphite, a metal constituting the salt is preferably a metal belonging to the Group 1, the Group 2, the Group 12 or the Group 13 of the periodic table (long period type). Specifically, preferred examples thereof include Na and K belonging to the Group 1, Mg belonging to the Group 2, Zn belonging to the Group 12, Al belonging to the Group 13, and the like. Specifically, at least one kind selected from the group consisting of an aluminum phosphate, a magnesium phosphate, a calcium phosphate, a potassium phosphate, a sodium phosphate and a zinc phosphate is preferably used. These phosphates are preferably hydrogenphosphates from the viewpoints of water solubility, pH and the like.

As a method for coating the graphite with the phosphate, a conventional method described, for example, in JP-A-2011-102381 can be used.

The content of the phosphate-coated graphite in the friction material is preferably from 1 to 9% by volume, and more preferably from 1 to 6% by volume, from the viewpoint of obtaining the suitable thickness of the transfer layer.

The content of the whole lubricating material is usually from 1 to 15% by volume in the friction material.

Although the various components which may be contained in the friction material are exemplified above, the respective components may be used either alone or in a combination of a plurality thereof.

<Production Method of Friction Material>

In order to produce the friction material according to the present invention, it can be produced by blending the above-mentioned respective components, performing the resulting blend according to an ordinary manufacturing method, and performing treatments such as thermoforming, heating and grinding. A brake pad including the above-mentioned friction material can be produced by the following steps (1) to (4):

(1) a step of forming a steel plate (pressure plate) into a predetermined shape by a sheet-metal press, (2) a step of subjecting the steel plate formed into the predetermined shape to degreasing treatment, chemical treatment and primer treatment, and coating it with an adhesive, (3) a step of thermoforming the pressure plate which has passed through the above-mentioned steps (1) and (2) and the above-mentioned preformed body of the friction material, at a predetermined temperature and pressure in a thermoforming step to integrally fix both members, and (4) a step of thereafter performing after curing, and finally performing finishing treatment such as grinding, scorching and coating.

EXAMPLES

The present invention is specifically described below by examples. However, the present invention should not be limited to these examples alone.

Examples 1 to 8 and Comparative Examples 1 to 4

Blending materials of each friction material were uniformly mixed in a mixer according to the blending composition (% by volume) shown in Table 1 to obtain each friction material mixture. Subsequently, the friction material mixture was preformed at room temperature and a pressure of 20 MPa for 10 seconds. The preformed product after forming was put in a thermoforming mold, and a metal plate (pressure plate: P/P) previously coated with an adhesive was laminated thereon, followed by thermocompression following at a temperature of 150° C. and a forming surface pressure of 40 MPa for 5 minutes. The thermocompression formed product was heat-treated at a temperature of 150 to 300° C. for 1 to 4 hours, and ground and coated to a predetermined thickness. Thus, brake pads containing friction materials according to Examples 1 to 8 and Comparative Examples 1 to 4 were obtained.

As lithium potassium titanate, layered scale-like TERRACESS L-SS (manufactured by Otsuka Chemical Co., Ltd.) was used. As magnesium potassium titanate, layered scale-like TERRACESS P-SS (manufactured by Otsuka Chemical Co., Ltd.) was used. As potassium titanate, fibrous TISMO D (manufactured by Otsuka Chemical Co., Ltd.) and TERRACESS JP (manufactured by Otsuka Chemical Co., Ltd.) having a shape having a plurality of convex portions were each used.

As the ceramic fiber, $SiO_2$—MgO—SrO-based biosoluble fiber having a shot content of 60% (BIOSTAR 200/50 manufactured by ITM Co., Ltd.) was used.

The phosphate-coated graphite was obtained by the following procedure.

Aluminum dihydrogen phosphate was dissolved in pure water to prepare an aqueous solution thereof having a concentration of 1% by mass. To 100 parts by mass of this aqueous solution, 42 parts by mass of artificial graphite (manufactured by Tokai Carbon Co., Ltd., G152A (trade name), average particle diameter: 700 μm) was added, followed by stirring with a rotary blade type stirrer (manufactured by AS ONE Corporation, PM-203 (model name)) at a temperature of 50° C. for 1 hour.

After dried in the atmosphere for 24 hours, a resulting mixture was disintegrated, and thereafter, heat treated in vacuum at 800° C. for 3 hours. After the heat treatment, it was pulverized in a mortar to obtain a graphite powder whose particle surfaces were coated with aluminum dihydrogen phosphate (phosphate-coated graphite).

A method for evaluating friction characteristics of a resulting brake pad is shown below.

In accordance with JASO C427 (wear test at different temperatures), evaluation of friction characteristics was performed by using a 1/7 scale tester. Fixing the initial speed to 50 km/h and the deceleration to 2.94 m/s$^2$, burnishing was performed 200 times. Thereafter, braking was repeated 500 times at 300° C., 500 times at 400° C. and 500 times at 500° C. For the wear amounts after brakings at 400° C. and 500° C. and the friction coefficient μ after braking at 500° C., average values were each determined. The wear amount was converted to that corresponding to braking repeated 1000 times. The results are shown in Table 1. As a disc rotor material, one corresponding to FC250 was used.

In Table 1, "500° C. wear evaluation" means that the case where the pad wear amount at 500° C. is −30% or less based on the result of Comparative Example 1 is evaluated as A, that the case where it is more than −30% and −10% or less is evaluated as B, that the case where it is more than −10% and less than +10% is evaluated as C, and that the case where it is +10% or more is evaluated as D.

"500° C. performance evaluation" means that the case where the average for the friction coefficient μ at 500° C. is 0.4 or more is represented as A, and that the case where it is less than 0.4 is represented as B.

TABLE 1

| (% by volume) | | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|---|
| Blending Composition | Binder | Straight phenol resin | 18.0 | 18.0 | 18.0 | 18.0 | 18.0 | 18.0 | 18.0 | 18.0 | 18.0 | 18.0 | 18.0 | 18.0 |
| | Filler | Rubber dust | 8.0 | 8.0 | 8.0 | 8.0 | 8.0 | 8.0 | 8.0 | 8.0 | 8.0 | 8.0 | 8.0 | 8.0 |
| | | Cashew dust | 8.0 | 8.0 | 8.0 | 8.0 | 8.0 | 8.0 | 8.0 | 8.0 | 8.0 | 8.0 | 8.0 | 8.0 |
| | | Barium sulfate | 17.5 | 15.5 | 12.5 | 30.5 | 3.5 | 15.5 | 15.5 | 15.5 | 9.5 | 15.5 | 15.5 | 15.5 |
| | | Calcium hydroxide | 3.5 | 3.5 | 3.5 | 3.5 | 3.5 | 3.5 | 3.5 | 3.5 | 3.5 | 3.5 | 3.5 | 3.5 |
| | | Mica | 2.0 | 2.0 | 2.0 | 2.0 | 2.0 | 2.0 | 2.0 | 2.0 | 2.0 | 2.0 | 2.0 | 2.0 |
| | | Lithium potassium titanate | 12.0 | 12.0 | 12.0 | 2.0 | 20.0 | 6.0 | 0 | 12.0 | 0 | 0 | 0 | 18.0 |
| | | Magnesium potassium titanate | 0 | 0 | 0 | 0 | 0 | 0 | 12.0 | 0 | 0 | 0 | 0 | 0 |
| | | Potassium titanate (fibrous) | 0 | 0 | 0 | 0 | 0 | 0 | 0 | 6.0 | 0 | 0 | 0 | 0 |
| | | Potassium titanate (having a plurality of convex portions) | 6.0 | 6.0 | 6.0 | 1.0 | 10.0 | 12.0 | 6.0 | 0 | 18.0 | 18.0 | 18.0 | 0 |
| | Abrasive | Zirconium silicate | 4.0 | 4.0 | 4.0 | 4.0 | 4.0 | 4.0 | 4.0 | 4.0 | 4.0 | 4.0 | 4.0 | 4.0 |
| | | Triiron tetraoxide | 3.5 | 3.5 | 3.5 | 3.5 | 3.5 | 3.5 | 3.5 | 3.5 | 3.5 | 3.5 | 3.5 | 3.5 |
| | Lubricating material | Graphite | 0 | 6.0 | 8.0 | 6.0 | 6.0 | 6.0 | 6.0 | 6.0 | 9.0 | 9.0 | 0 | 6.0 |
| | | Phosphate-coated graphite | 9.0 | 3.0 | 1.0 | 3.0 | 3.0 | 3.0 | 3.0 | 3.0 | 0 | 0 | 9.0 | 3.0 |
| | | PTFE | 0.5 | 0.5 | 0.5 | 0.5 | 0.5 | 0.5 | 0.5 | 0.5 | 0.5 | 0.5 | 0.5 | 0.5 |
| | Fiber | Aramid pulp | 6.5 | 6.5 | 6.5 | 6.5 | 6.5 | 6.5 | 6.5 | 6.5 | 6.5 | 6.5 | 6.5 | 6.5 |
| | | Ceramic fiber | 1.0 | 3.0 | 6.0 | 3.0 | 3.0 | 3.0 | 3.0 | 3.0 | 3.0 | 3.0 | 3.0 | 3.0 |
| | | Copper fiber | 0 | 0 | 0 | 0 | 0 | 0 | 0 | 0 | 6.0 | 0 | 0 | 0 |
| | Metal powder | Iron powder | 0.5 | 0.5 | 0.5 | 0.5 | 0.5 | 0.5 | 0.5 | 0.5 | 0.5 | 0.5 | 0.5 | 0.5 |
| Total | | | 100 | 100 | 100 | 100 | 100 | 100 | 100 | 100 | 100 | 100 | 100 | 100 |
| Friction performance | | Pad wear (mm) @ 400° C. | 0.37 | 0.35 | 0.44 | 0.41 | 0.36 | 0.31 | 0.38 | 0.37 | 0.44 | 0.47 | 0.47 | 0.25 |
| | | Pad wear (mm) @ 500° C. | 0.42 | 0.40 | 0.64 | 0.70 | 0.41 | 0.55 | 0.53 | 0.42 | 0.78 | 1.23 | 1.05 | 0.35 |
| | | Rotor wear (μm) @ 400° C. | 0.33 | 0.50 | 2.00 | 1.50 | 0.50 | 2.50 | 1.50 | 1.00 | 1.00 | 1.67 | 1.50 | 1.00 |
| | | Rotor wear (μm) @ 500° C. | 0.75 | 1.33 | 2.50 | 1.67 | 1.33 | 1.67 | 1.67 | 1.50 | 1.00 | 1.50 | 0.67 | 1.67 |
| | | Friction coefficient μ @ 500° C. | 0.40 | 0.42 | 0.47 | 0.45 | 0.40 | 0.42 | 0.40 | 0.43 | 0.47 | 0.44 | 0.42 | 0.37 |
| 500° C. friction evaluation | | | A | A | B | B | A | B | A | A | — | D | D | A |
| 500° C. performance evaluation | | | A | A | A | A | A | A | A | A | A | A | A | B |

The brake pad containing the friction material according to Comparative Example 1 contains copper fiber, and the blending composition thereof corresponds to a blending composition which has been conventionally generally used as a friction material of a NAO (Non-Asbestos Organic) material. In the brake pad containing the friction material according to Comparative Example 2 in which no copper fiber is blended, the pad wear amount at 500° C. extremely increases as high as +58% (described as D in the table), compared to that of Comparative Example 1. This is considered because the adhesion coating film caused by copper is not formed on the counterpart material. Further, in Comparative Example 3, even when only the phosphate-coated graphite which is considered to form the transfer film on the counterpart material is added, the wear amount at 500° C. remains as large as +35% (described as D in the table), compared to that of Comparative Example 1.

However, in Example 7, it has been found that the wear amount at 500° C. is considerably improved as low as −32% (described as A in the table), compared to that of Comparative Example 1, by adding magnesium potassium titanate in addition to potassium titanate. Further, in Examples 1 to 6 and 8, the wear amount at 500° C. is considerably improved, compared to that of Comparative Example 1, also by adding lithium potassium titanate in addition to potassium titanate. At this time, as shown in Examples 1 to 3, the good friction coefficient and friction characteristics have been obtained even when the blending ratio of the graphite and the phosphate-coated graphite as the lubricating materials and the content of the ceramic fiber are changed.

Furthermore, from the results of Examples 2 and 4 to 8, it has been found that when the two kinds of different titanates are contained, the effects of the present invention can be obtained regardless of the kind of titanates, the blending amount thereof in the whole friction material and the blending ratio of the two kinds of titanates.

From the above, it has been found that the friction material is prevented from being decreased in friction coefficient at high temperature and obtains good wear resistance, by containing the two or more kinds of different titanates and the ceramic fiber, even when the adhesion coating film caused by the copper component is not formed. This is considered that the transfer film is formed on the counterpart material by the two or more different titanates, thereby being able to obtain the good friction coefficient, and further, that the transfer film is appropriately ground by the ceramic fiber to obtain the appropriate thickness, resulting in obtaining good wear resistance. For this reason, it has been found that, according to the present invention, the excellent friction material showing performance equivalent to or higher than that of the conventional friction material containing the copper component can be obtained.

While the present invention has been described in detail and with reference to specific embodiments thereof, it will be apparent to those skilled in the art that various changes and modifications can be made therein without departing from the spirit and scope of the present invention. This application is based on Japanese Patent Application No. 2013-192144 filed on Sep. 17, 2013, the contents of which are incorporated herein by reference.

INDUSTRIAL APPLICABILITY

The friction material according to the present invention is a friction material with low environmental load, because of containing no copper component. Further, in spite of containing no copper component, the friction material having a friction coefficient equivalent to or better than that of a conventional one at high temperature and excellent wear resistance is obtained by containing two or more kinds of different titanates and ceramic fiber. Accordingly, it is particularly useful to apply the friction material according to the present invention to brake pads or brake linings, clutches and the like to be used for automobiles, railway vehicles, industrial machines and the like, and its technical meaning is extremely significant.

The invention claimed is:

1. A friction material comprising:
two or more kinds of titanates; and
a ceramic fiber,
wherein the friction material comprises no copper component,
wherein the two or more kinds of titanates comprise an alkaline earth metal-alkali metal titanate and an alkali metal titanate, and
wherein the ceramic fiber has a fiber diameter of 0.1 to 10 μm, a fiber length of 1 to 1000 μm, and a shot content of 0.1 to 70% by mass.

2. The friction material according to claim 1, wherein the two or more kinds of titanates further comprise magnesium potassium titanate and potassium titanate.

3. The friction material according to claim 1, wherein a content of the two or more kinds of titanates in the friction material is from 3 to 40% by volume in total.

4. The friction material according to claim 1, wherein a content of the ceramic fiber in the friction material is from 1 to 6% by volume.

5. A friction material comprising:
two or more kinds of titanates; and
a ceramic fiber,
wherein the friction material comprises no copper component,
wherein the two or more kinds of titanates comprise lithium potassium titanate and an alkali metal titanate, and
wherein the ceramic fiber has a fiber diameter of 0.1 to 10 μm, a fiber length of 1 to 1000 μm, and a shot content of 0.1 to 70% by mass.

6. The friction material according to claim 5, wherein a content of the two or more kinds of titanates in the friction material is from 3 to 40% by volume in total.

7. The friction material according to claim 5, wherein a content of the ceramic fiber in the friction material is from 1 to 6% by volume.

8. A friction material comprising:
two or more kinds of titanates; and
a ceramic fiber,
wherein the friction material comprises no copper component,
wherein the two or more kinds of titanates comprise lithium potassium titanate and potassium titanate, and
wherein the ceramic fiber has a fiber diameter of 0.1 to 10 μm, a fiber length of 1 to 1000 μm, and a shot content of 0.1 to 70% by mass.

9. The friction material according to claim 8, wherein a content of the two or more kinds of titanates in the friction material is from 3 to 40% by volume in total.

10. The friction material according to claim 8, wherein a content of the ceramic fiber in the friction material is from 1 to 6% by volume.

* * * * *